(12) United States Patent
Dubrovsky et al.

(10) Patent No.: US 12,511,370 B2
(45) Date of Patent: Dec. 30, 2025

(54) MANAGING DEPLOYMENT OF SERVICES TO DATA PROCESSING SYSTEMS

(71) Applicant: Dell Products L.P., Round Rock, TX (US)

(72) Inventors: Igor Dubrovsky, Beer Sheva (IL); Boris Shpilyuck, Ashdod (IL); Maxim Balin, Gan-Yavne (IL); Nisan Haimov, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 18/495,175

(22) Filed: Oct. 26, 2023

(65) Prior Publication Data

US 2025/0139219 A1    May 1, 2025

(51) Int. Cl.
| G06F 21/00 | (2013.01) |
| G06F 8/60 | (2018.01) |
| G06F 21/44 | (2013.01) |
| H04L 9/00 | (2022.01) |
| H04L 9/14 | (2006.01) |

(52) U.S. Cl.
CPC ............... *G06F 21/44* (2013.01); *G06F 8/60* (2013.01); *H04L 9/14* (2013.01)

(58) Field of Classification Search
CPC ............... G06F 8/60; G06F 21/44; H04L 9/14
See application file for complete search history.

(56) References Cited

U.S. PATENT DOCUMENTS

| 2017/0111331 A1* | 4/2017 | Auradkar | ............ H04L 63/0428 |
| 2022/0374257 A1* | 11/2022 | Fan | ...................... H04L 43/0852 |
| 2024/0214229 A1* | 6/2024 | Han | .......................... H04L 9/50 |
| 2024/0406278 A1* | 12/2024 | Patro | .................... G06F 9/44505 |

\* cited by examiner

*Primary Examiner* — Rodman Alexander Mahmoudi
(74) *Attorney, Agent, or Firm* — WOMBLE BOND DICKINSON (US) LLP (57) ABSTRACT

Methods and systems for managing the operation of data processing systems are disclosed. To manage the operation of the data processing systems, containerized services may be deployed. Once deployed, desired services may be provided. Prior to deployment, images and metadata used in the deployment may be analyzed. The analysis may reduce threats presented by the deployment of the containerized services. During the analysis, the integrity of the images and metadata may be verified, and the privilege of containerized services based on the metadata and images may be reviewed.

20 Claims, 6 Drawing Sheets

MANAGING DEPLOYMENT OF SERVICES TO DATA PROCESSING SYSTEMS

FIELD

Embodiments disclosed herein relate generally to management of systems. More particularly, embodiments disclosed herein relate to management of service deployment for systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services using data processing systems. To provide computer implemented services, data processing systems may be deployed to a location. The data processing systems may provide the services cooperatively and/or individually.

To provide different types of services, various software may be deployed to and hosted by the data processing systems. The software may cause different types of services to be provided.

However, deploying software may present risk of compromise to the data processing systems. The software may include malicious code or may require elevated privilege allowing the software to undesirably interact with other system components.

To reduce the likelihood of compromise, containerized services may be prepared for and deployed. During preparation, the containerized services may be analyzed with respect to integrity, privilege, and security. If found acceptable, then new instances may be deployed using images and metadata verified during the preparation process. Additionally, dynamically generated secrets may be deployed along with the containerized service instances so that secrets do not need to be included with the images/metadata.

Thus, embodiments disclosed herein may address, among others, the technical problem of trust in distributed systems. By preparing and deploying containerized services, the risk of compromise may be reduced.

In an embodiment, a method for securing a deployment include data processing systems is provided. The method may include obtaining a request for deployment of a service to a data processing system of the data processing systems: initiating a deployment preparation process based on the request; during the deployment preparation process: obtaining a signed image and signed metadata for the service; verifying integrity of the signed image and the signed metadata; in an instance of the verifying where the integrity is able to be verified: checking a privilege of the service using the signed metadata with respect to a privilege standard for the service; in an instance of the checking where the privilege meets the privilege standard for the service: generating at least one secret for the service; instantiating a new instance of the service using the signed image, the signed metadata, and the at least one secret to initiate providing of desired computer implemented services by the new instance of the service.

The method may also include, during the deployment preparation process: generating an audit log for deployment of the new instance of the service.

The audit log may indicate actions performed for the deployment of the new instance of the service.

The actions may include the generating of the at least one secret, the checking of the privilege, and the verifying of the integrity of the signed image and the signed metadata. The signed metadata may indicate the privilege of the service.

Verifying the integrity of the signed image may include identifying a public key of an entity alleged to have signed the image; and attempting to verify a signature and a payload of the signed image using the public key.

The privilege of the service may indicate a level of authority of the services in a host environment of the data processing system.

The privilege standard may indicate that the level of authority must be below a root user level of authority.

The privilege standard may indicate that the level of authority grants the services with a subset of the authorities granted by the root user level of authority.

The method may also include, prior to obtaining the request: obtaining source code for the service; generating the metadata using the source code; obtaining a private key of a public private keypair; and signing the metadata using the private key to obtain the signed metadata and signing an image based on the source code using the private key to obtain the signed image.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may cause the computer-implemented method to be performed when the computer instructions are executed by the processor.

Figure 1:
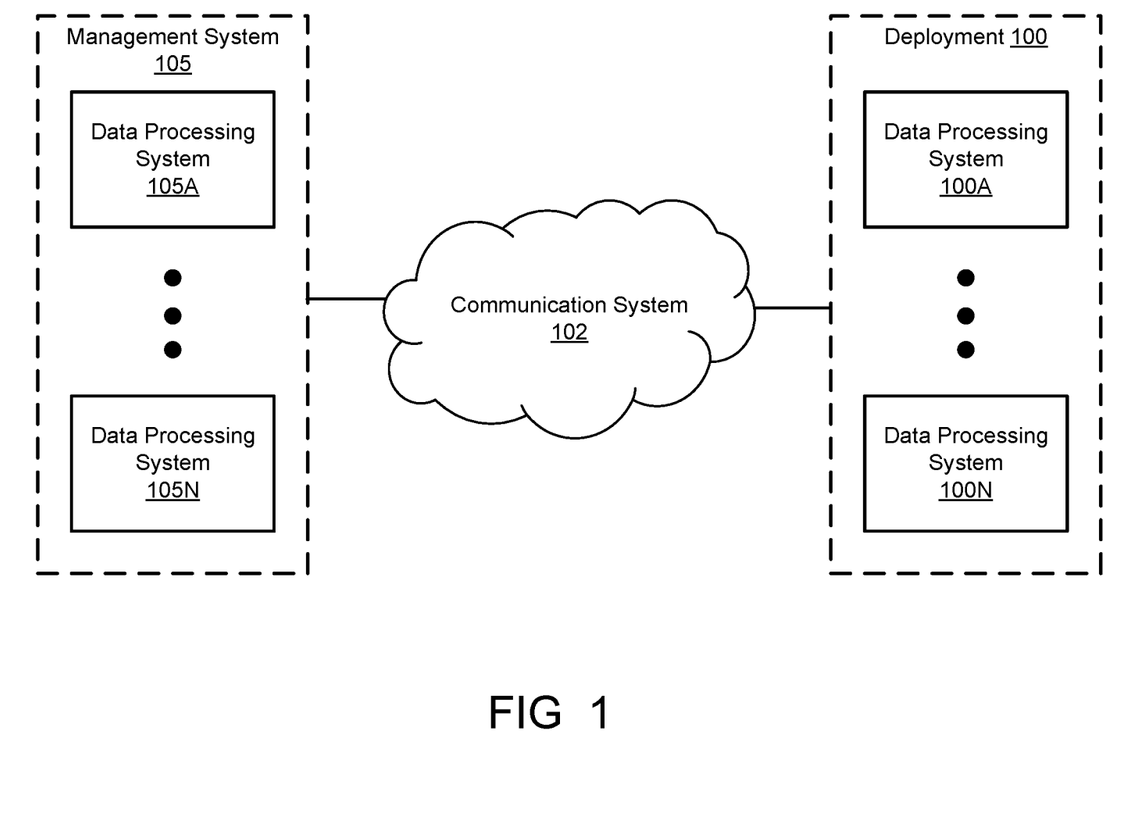
FIG. 1 shows a diagram illustrating a system in accordance with an embodiment.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, various instances of software may be deployed to host systems. When executed, the instances of the software may provide all, or a part of the computer implemented services.

For example, the instances of the software may include container images. The container images may include information usable to instantiate containerized environments in which instances of applications may be hosted. Each containerized environment may have access to some computing resources of a host system thereby allowing the applications in the containerized environments to operate independently.

To instantiate a containerized service instance, the image may be used. For example, host devices may include automation frameworks which may automatically instantiate new instances of containerized services using the image. The image may be used to allocate resources to the containerized environment, add data to memory/storage to place the containerized environment in condition to provide desired computer implemented services, and begin execution of the containerized environment to initiate providing of the desired computer implemented services.

However, instantiation of a containerized service using an image may present risk of compromise of the host device. For example, if the image includes malicious code, then the malicious code may begin to execute on the host device. In another example, if the image indicates root user access for the containerized environment, then application in the containerized environment may be able to modify data and/or operation of other environments (e.g., such as the host operating environment or other containerized environments).

In general, embodiments disclosed here relate to systems and methods for providing computer implemented services using services. To provide the computer implemented services, container images may be deployed to data processing systems.

During the deployment, the container images and associated metadata may be analyzed to verify the integrity, privilege, and security of the resulting operation of the instances of the containers (e.g., a containerized service). To verify the integrity of the container images and associated metadata, signatures and payloads may be verified using cryptographic data such as keys of public private keypairs.

To verify that the privilege of the containerized services is unlikely to compromise the host devices, the metadata for the container images may be reviewed to identify the level of privilege requested for resulting containerized service instances. For example, the level of privilege (e.g., root users, limited users, etc.) requested for the resulting instances of the containerized services may be compared to privilege standards for the services. If exceeded, then the container image may be deemed to require excessive privilege, which may place the host device at risk of being compromised due to the privilege.

To verify the security of the resulting operation of the instances of the containerized services, cryptographic data for the services may be generated dynamically and deployed with the services. Consequently, the cryptographic data used by instances of containerized services may not be identifiable using only the container image. For example, the container image may include placeholders for cryptographic data such as keys usable to secure data. Accordingly, the cryptographic data may be generated using various algorithms (e.g., a key derivation algorithm) that may change over time so that malicious entities are unlikely to predict the cryptographic data used by containerized service instances.

By doing so, embodiments disclosed herein may improve the likelihood that data processing systems are able to provide desired computer implemented services.

To provide the above noted functionality, the system of FIG. 1 may include deployment 100, management system 105, and communication system 102. Each of these components is discussed below.

Figure 2A:
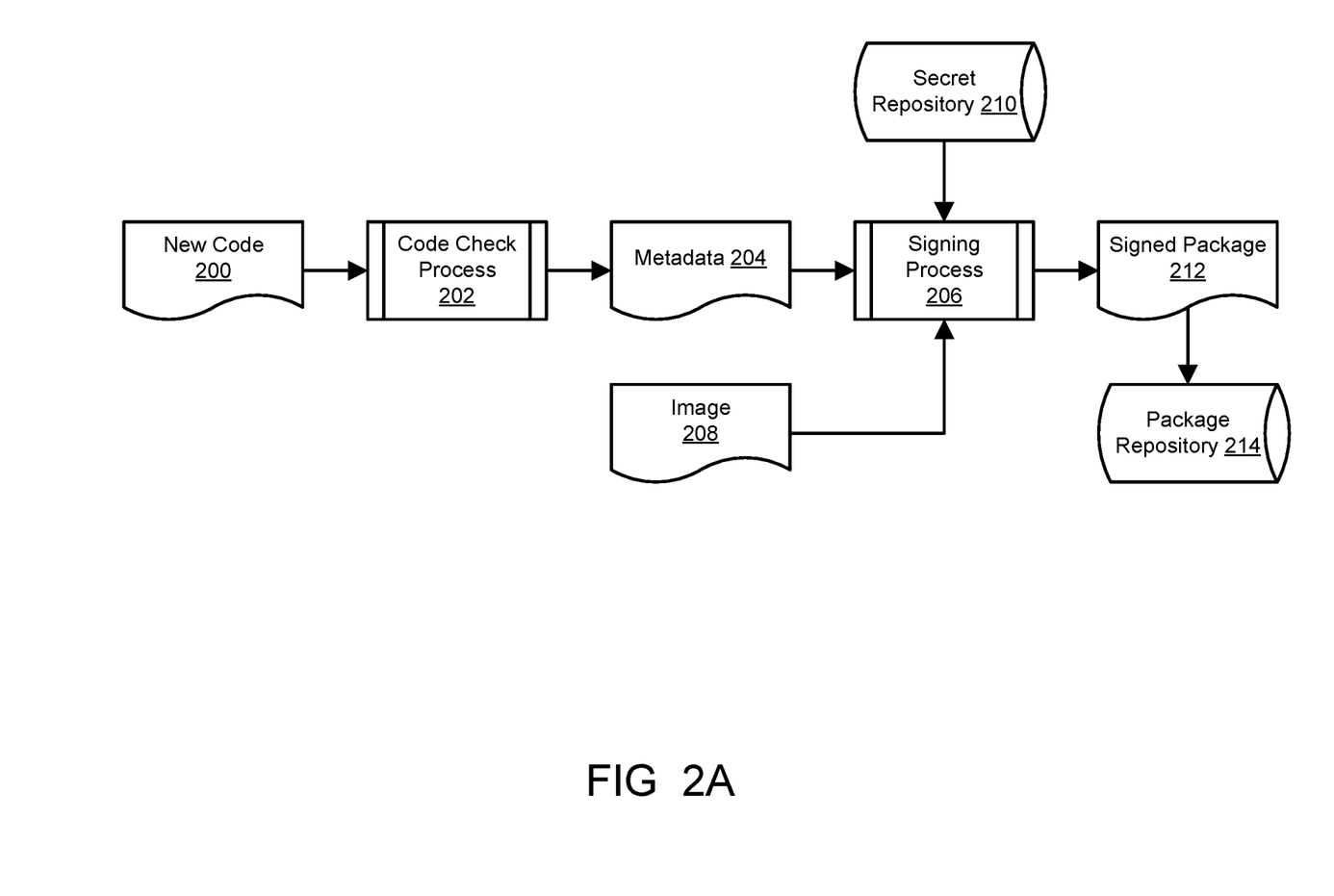
FIG. 2A-2C show data flow diagrams in accordance with an embodiment.
Figure 2B:
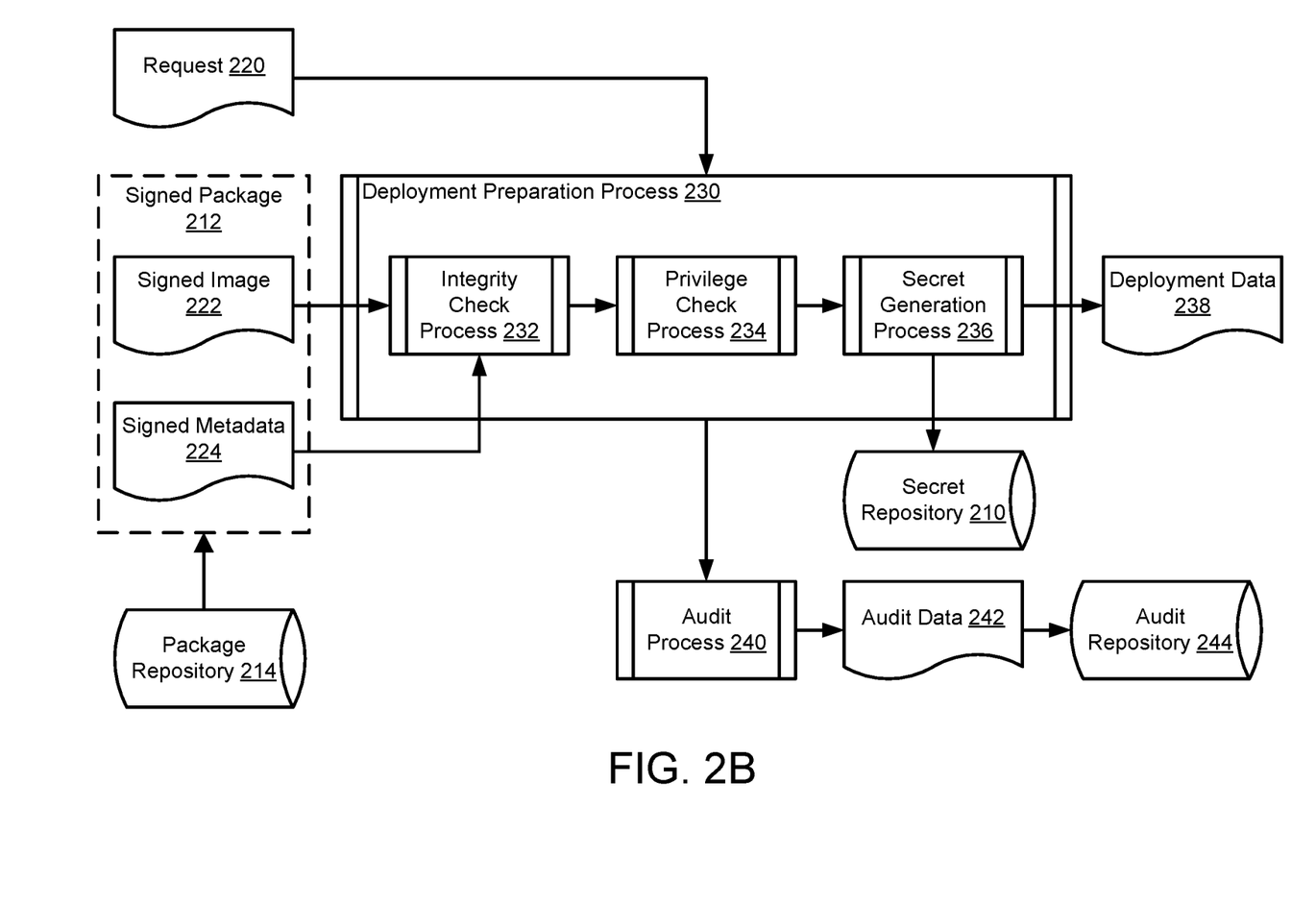
Figure 2C:
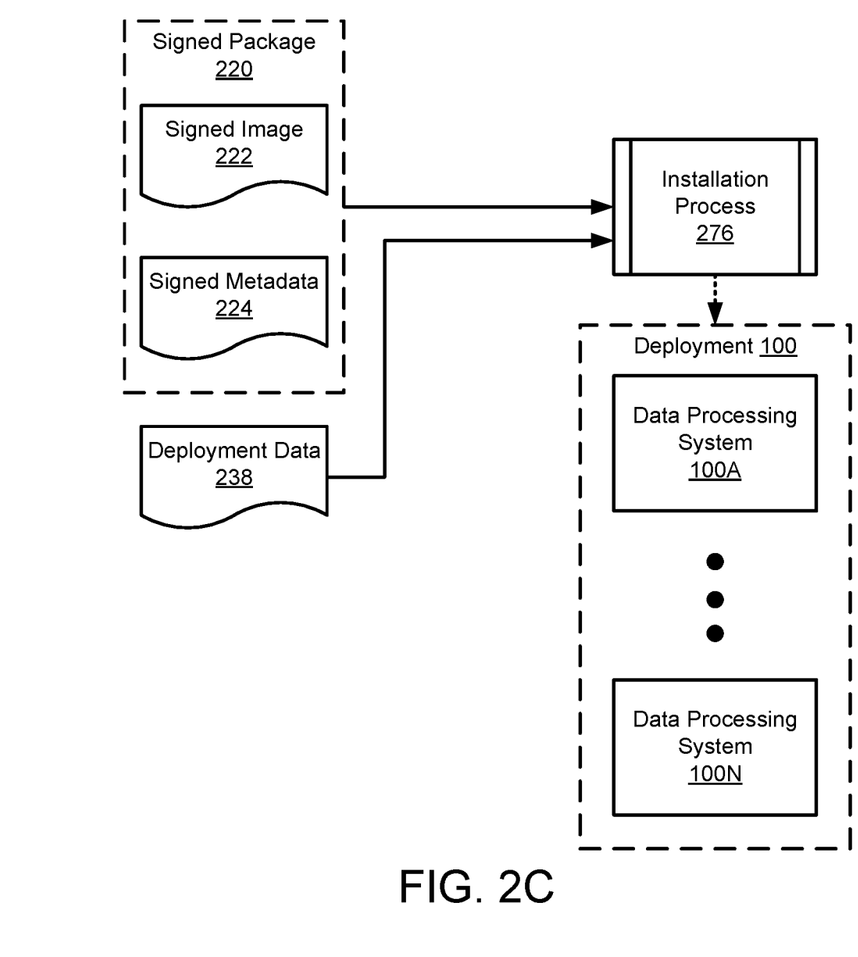

Management system 105 may include any number of data processing systems 105A-105N. Data processing systems 105A-105N may include software development tools for software development. For example, the software development tools may include integrated development environments, container fabrication software, image generation software, signing software, secret retention software (e.g., key vaults), and/or other tools for generating verifiable containers and corresponding metadata for use by deployment 100. The resulting images and metadata may then be used to deploy containerized services instances to deployment 100. Refer to FIGS. 2A-2C for additional details regarding image development using images to deploy containerized services.

Deployment 100 may include any number of data processing systems 100A-100N. Data processing system 100A-100N may host containerized services instantiated using images and metadata prepared and/or at the request of management system 105. Through use of the images to deploy containerized services, deployment 100 may provide any number and type of computer implemented services.

To facilitate deployment of instances of containerized services, any of the data processing systems may host automation framework and/or other software for instantiating container instances using container images and/or metadata for the containers. For example, the automation framework may ingest images/metadata to identify and allocate resources for new instances of containerized services, deploy data structure to memory and storage to put the new instances in condition for operation, and initiate operation of the containerized services.

Figure 3:
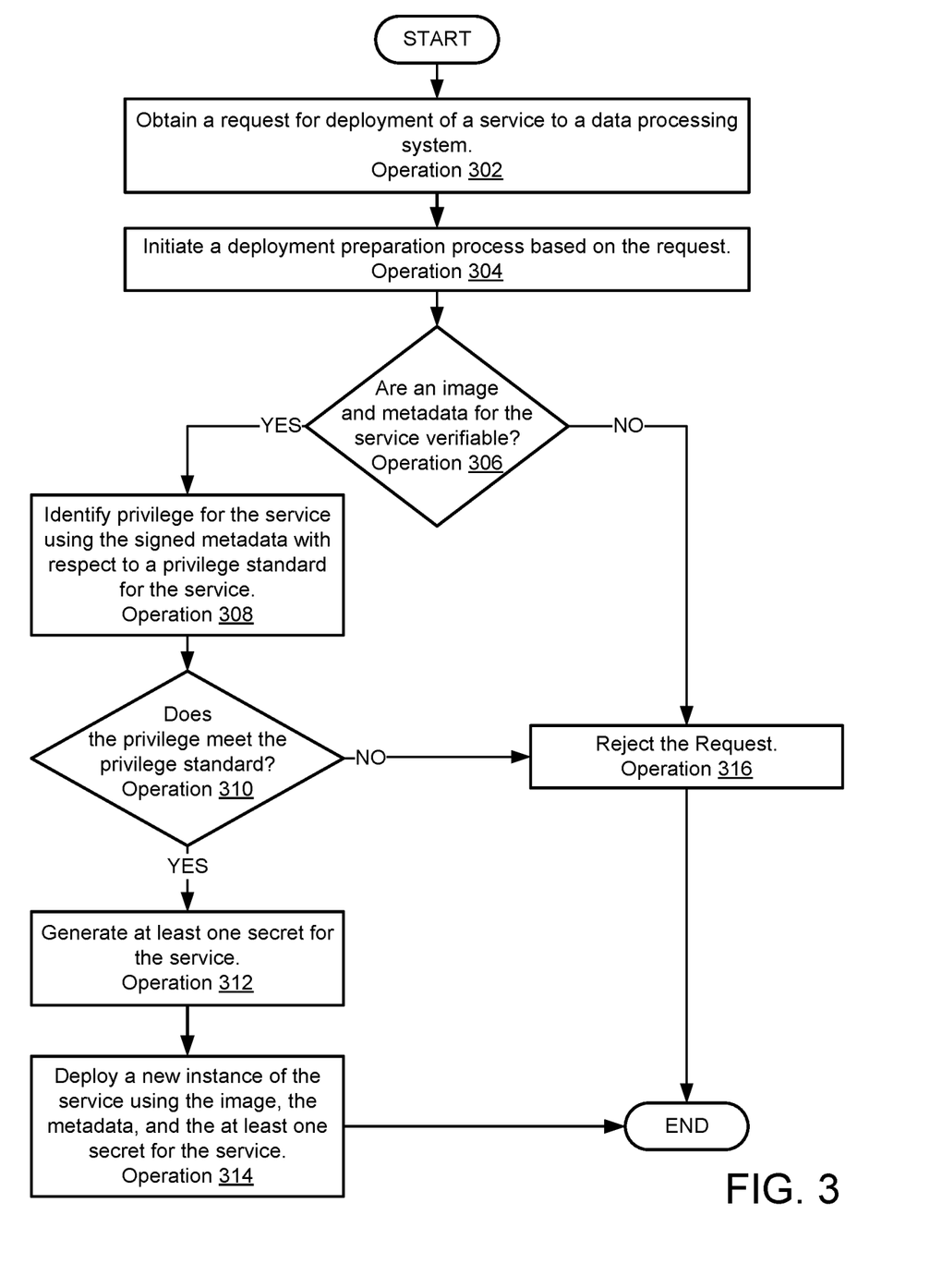
FIG. 3 shows a flow diagram illustrating a method in accordance with an embodiment.

When providing their functionalities, management system 105 and/or deployment 100 (and/or components thereof) may perform all, or a portion, of the data flows and/or methods shown in FIGS. 2A-3.

Any of (and/or components thereof) management system 105 and deployment 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 204, etc.) is used to represent data structures, a second set of shapes (e.g., 202, 206, etc.) is used to represent processes performed using and/or that generate data, and a third set of shapes (e.g., 210) is used to represent large scale data structure such as databases.

Turning to FIG. 2A, a first data flow diagram in accordance with an embodiment is shown. The first data flow diagram may illustrate data used in and data processing performed in preparation of a containerized service for deployment.

To prepare the containerized service for deployment, new code 200 (e.g., source code) for the containerized services may be ingested by code check process 202. New code 200 may be source code for a new containerized service for potential deployment.

During code check process 202, the source code may be syntactically analyzed to identify dependencies of the source code (e.g., drivers, other support programs), resources required for nominal operation, privilege required, and/or other information regarding an environment in which the source code may run in a nominal manner (e.g., expected or desired).

For example, the dependencies may be identified by searching the source code for application programming interface calls to other programs. Likewise, the resources required for nominal operation may be identified by estimating the quantity of resources for operation of the containerized service (e.g., may be estimated by ascribing processing weights to various syntax and/or program flow defined by the source code, and/or via other methods). Further, the privilege required may be identified by identifying calls to privileged resources of a host environment within the source code and/or via other methods.

The aforementioned information may be used to obtain metadata 204. Metadata 204 may be a data structure that includes the aforementioned information and/or information derived from the aforementioned information. Metadata 204 may also include other types of information without departing from embodiments disclosed herein.

Once obtained, an image (e.g., 208) for new code 200 and metadata 204 may be ingested by signing process. Image 208 may be an executable version of new code 200 (e.g., compiled code) hosted in a containerized environment. In other words, image 208 may be a container image that includes applications based on new code 200.

Once ingested, so long as the user and/or entity requesting that the containerized service be prepared for deployment has sufficient privilege to do so, metadata 204 and image 208 may be signed using a secret from secret repository 210.

Secret repository 210 may include secrets usable to place metadata 204 and image 208 in a verifiable state by signing them using cryptographically verifiable data structures. For example, secret repository 210 may include any number of public private keypairs. A private key of a keypair may be used to sign each of these data structures using any signing algorithm to generate corresponding signed data structures that are verifiable using the public key of the keypair.

These signed data structures may be added to signed data package 212. Signed data package 212 may then be stored in package repository 214. Once stored in package repository 214, signed package 212 may be used to deploy containerized services to any number of data processing systems.

Turning to FIG. 2B, a second data flow diagram in accordance with an embodiment is shown. The second data flow diagram may illustrate data used in and data processing performed in starting a process for deploying a containerized service.

To start deployment of a containerized service, a person or automated system may generate request 220. Request 220 may be a request for deployment of a containerized service to a data processing system. The request may indicate the data processing system to which the containerized service is to be deployed, as well as the requested containerized service.

The identity of the containerized service may be used to lookup or otherwise obtain signed data package 212 (in this example, it will be appreciated that other signed packages may be obtained from the repository) from package repository 214. Signed package 212 may include signed image 222 (e.g., a signed version of image 208) and signed metadata 224 (e.g., a signed version of metadata 204). Once obtained and prior to use in deployment of a containerized service, deployment preparation process 230 may be performed. During deployment preparation process 230, the integrity, privilege, and security of signed package 212 and resulting containerized services instances based on signed package 212 may be verified prior to deployment.

To do so, deployment preparation process 230 may include integrity check process 232, privilege check process 234, and secret generation process 236. Each process is discussed below.

During integrity check process 232, the integrity of signed image 222 and signed metadata 224 may be verified. For example, signature verification algorithms may be performed using public keys corresponding to the private keys used to sign signed image 222 and signed metadata 224. By performing the algorithm, the integrity of the payloads of these data structures may be verified, as well as verifying that the data structures are signed by a trusted (e.g., privileged) entity. For example, the public keys of the keypairs used to signed data structures may be published such that any entity in a distributed system may verify whether data structures have been signed with corresponding private keys.

If not successfully verified, then the request may be denied.

If successfully verified, then the data structures may be ingested by privilege check process 234. During privilege check process 234, the privilege for resulting instances of the containerized service may be compared to privilege standards for services hosted by deployments. For example, the signed metadata may be reviewed to identify the privilege that will be given to resulting containerized services generated using signed image 222. The identified privilege may then be compared to the privilege standard for that service to determine whether the privilege for the containerized service exceeds the privilege standard for a future host system.

The privilege standard may indicate, for example, that the privilege afforded to containerized services may not be root user authority, may only be a portion of the authority of the root user, may be a predefined level of user authority (e.g., a subset of the authority of a root user), etc.

If the identified privilege exceeds the privilege standard, then the request may be denied.

If the identified privilege meets the privilege standard, then secret generation process 236 may be performed. During secret generation, secrets for the containerized service may be generated. For example, the secrets may be generated using a key derivation algorithm. Once generated, copies of the secrets may be retained in secret repository 210, and copies of the secrets may be added to deployment data 238.

If deployment data 238 is generated, then a containerized services instances may be authorized and moved ahead for deployment. Refer to FIG. 2C for additional information regarding deployment of a containerized service instances.

While the aforementioned process (i.e., 230) is being performed and during subsequent deployment of containerized service instances using deployment data 238, audit process 240 may be performed. During audit process 240, information regarding deployment preparation process 230 and/or outcomes of the sub-processes may be stored as audit data 242. Audit data 242 may be establish an auditable log usable to verify that proper procedures for vetting signed packages (e.g., 212) ahead of use were employed prior to deployment of a containerized service based on service package 212.

Once obtained, audit data 242 may be stored in audit repository 244 for future use.

Thus, preparation for deployment of containerized services may be in place.

Turning to FIG. 2C, a third data flow diagram in accordance with an embodiment is shown. The third data flow diagram may illustrate data used in and data processing performed in completing a process for deploying a containerized service.

To complete deployment of a containerized service, signed package 212 and deployment data may be ingested by installation process 276 (e.g., part of an automation framework for deploying container instances).

During installation process 276, a new instance of a containerized service may be instantiated on a data processing system of deployment 100. To do so, deployment data 238 may be used to supply applications and/or other part of a container instances generated based on signed image 222 with secrets usable to secure data, verify authority, and/or perform other desired management processes.

For example, a container instance with one or more applications and/or management entities may be instantiated. Various placeholders in the data structures of the container instance may be replaced with the secrets from deployment data 238. By doing so, a containerized service may begin to operate once the container instance begins to execute using resources of the host data processing system.

The aforementioned process may be repeated any number of times and with respect to other data processing systems to deploy any number of containerized services across deployment 100. However, each time different deployment data may be used thereby causing the different instances to use different secrets.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage operation of data processing systems. FIG. 3 illustrates a method that may be performed by the components of FIG. 1. In the diagram discussed below and shown in FIG. 3, any of the operations may be repeated, performed in different orders, and/or performed in parallel with and/or in a partially overlapping in time manner with other operations.

Turning to FIG. 3, a flow diagram illustrating a method of managing operation of data processing systems of a deployment in accordance with an embodiment is shown. The method may be performed, for example, by any of the components of the system of FIG. 1, and/or other components not shown therein.

At operation 302, a request for deployment of a service to a data processing system is obtained. The request may be obtained by receiving it from another device, by reading it from storage, by generating it based on user input, and/or via other methods.

The request may specify the service (e.g., a containerized service) to be deployed, and an identity (or information usable to identify) of the data processing system. The request may not specify the data processing system (e.g., the deployment location may be left to an automated system).

The request may be from a person (e.g., an administrator) or an automated system.

At operation 304, a deployment preparation process for the service is initiated based on the request. Receiving the request may automatically initiate performance of the process. The deployment preparation process may include verification of the integrity of images and metadata usable to deploy an instance of the service, verification that privilege for the service meets privilege standards, and generation of secrets for the instance of the service.

At operation 306, a determination is made regarding whether and image and metadata for the service are verifiable. The determination may be made by attempting to verify signatures of the image and metadata. The attempt may be made using a signature verification algorithm and a public key usable to verify the signatures. The images and metadata may be verifiable if the signature verification algorithm indicates that the payloads of the image and metadata are intact, and that the signatures were generated using a private key corresponding to the public key. It will be appreciated that different public and private keys may be used to separately verify the image and the metadata.

If the image and metadata are verifiable, then the method may proceed to operation 308. Otherwise, the method may proceed to operation 316.

The image may be a container image. The metadata may specify information regarding containerized service instances that may be instantiated using the container image.

At operation 308, privilege for the service is identified using signed metadata with respect to a privilege standard for the service. The privilege may be identified by reading it from the signed metadata. The privilege standard for the service may be a maximum or other criteria that discriminates acceptable from unacceptable privilege. For example, the privilege standard may indicate that instances for the service are only to be afforded less than root user authority. The privilege may be the level of authority that will be afforded by containerized services generated using the image.

At operation 310, a determination is made regarding whether the privilege meets the privilege standard. The determination may be made by comparing the privilege to the privilege standard. The privilege may meet the privilege standard if it is considered acceptable in view of the privilege standard (e.g., below a threshold level).

If the privilege meets the privilege standard, then the method may proceed to operation 312. Otherwise, the method may proceed to operation 316.

At operation 312, at least one secret for the service is generated. The at least one secret may be generated by performing a secret derivation algorithm. The secret derivation algorithm may be a key derivation algorithm. Any number of secrets may be generated.

At operation 314, a new instance of the service is deployed using the image, the metadata, and the at least one secret for the service. The new instance may be deployed by providing the aforementioned data to an automation framework which may allocate resources, load data from the image into storage/memory, and initiate execution of computer code corresponding to the service.

The method may end following operation 314.

Returning to operations 306 and 316, the method may proceed to operation 316 following either of these operations under corresponding conditions.

At operation 316, the request is rejected. The request may be rejected by refusing to instantiate a new instance of the service. A notification or other information may be provided to a requestor to indicate that the request has been rejected.

The method may end following operation 316.

Throughout the method shown in FIG. 3, various information regarding the preparation for and deployment of the service may be recorded and stored to establish an audit log. The audit log may be usable to verify that the containerized service instances deployed is likely to operate in a desired manner (e.g., not compromise the host system).

Thus, using the method illustrated in FIG. 3, embodiments disclosed herein may reduce the likelihood of data processing systems being compromised by preparing for deployment of new containerized service instances.

Figure 4:
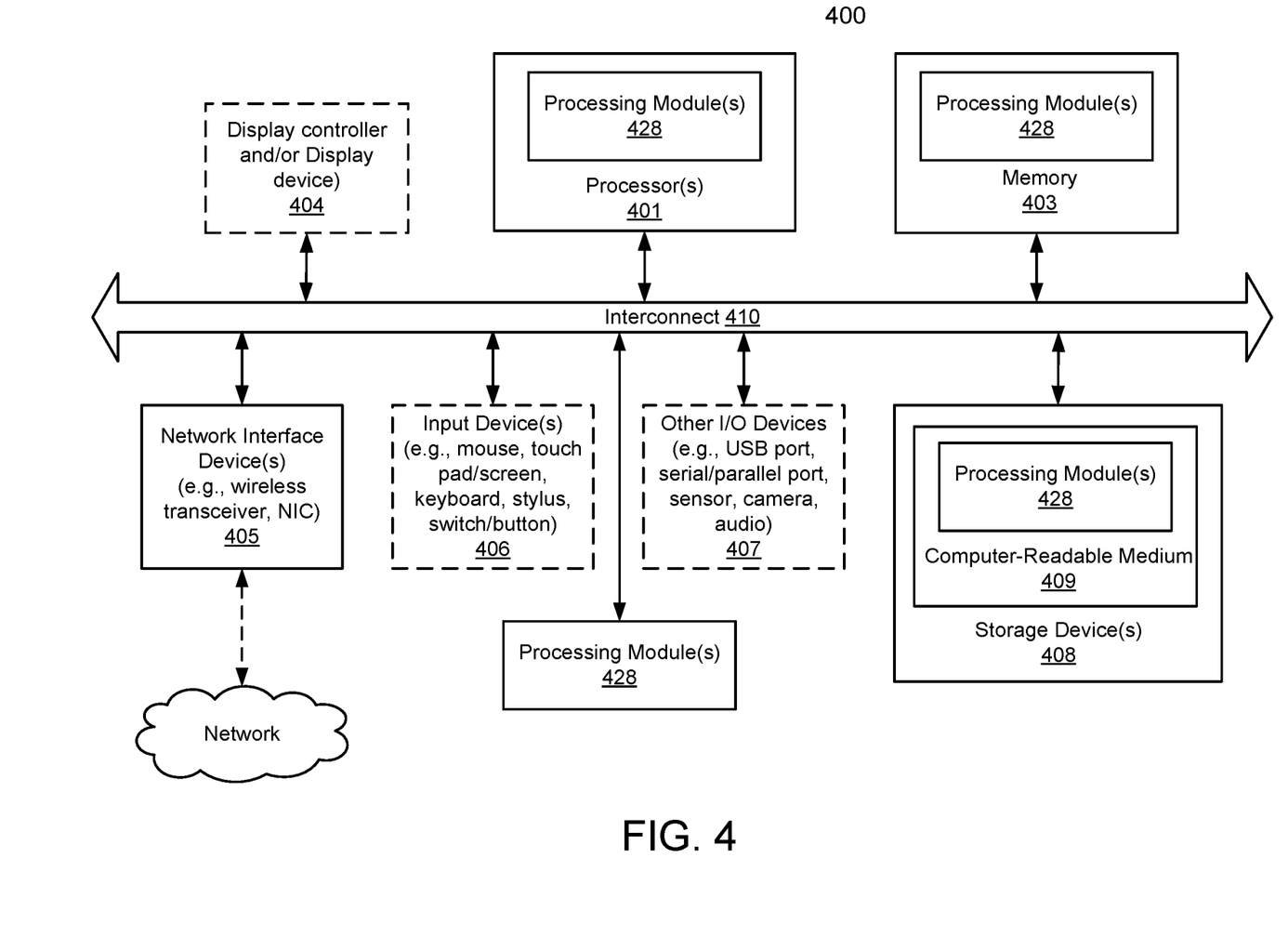
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor

401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing a deployment comprising a data processing system, the method comprising:
    obtaining a request for deployment of a service to the data processing system;
    initiating a deployment preparation process based on the request;
    during the deployment preparation process:
        obtaining a signed image and signed metadata for the service;
        verifying integrity of the signed image and the signed metadata;
        in an instance of the verifying where the integrity is verified:
            checking a privilege of the service using the signed metadata with respect to a privilege standard for the service;
            in an instance of the checking where the privilege meets the privilege standard for the service:
                generating at least one secret for the service; and
                instantiating a new instance of the service using the signed image, the signed metadata, and the at least one secret to initiate providing of desired computer implemented services by the new instance of the service.

2. The method of claim 1, further comprising:
    during the deployment preparation process:
        generating an audit log for deployment of the new instance of the service.

3. The method of claim 2, wherein the audit log indicates actions performed for the deployment of the new instance of the service.

4. The method of claim 3, wherein the actions comprise the generating of the at least one secret, the checking of the privilege, and the verifying of the integrity of the signed image and the signed metadata.

5. The method of claim 1, wherein the signed metadata indicates the privilege of the service.

6. The method of claim 1, wherein verifying the integrity of the signed image comprises:
    identifying a public key of an entity alleged to have signed the image; and
    attempting to verify a signature and a payload of the signed image using the public key.

7. The method of claim 1, wherein the privilege of the service indicates a level of authority of the services in a host environment of the data processing system.

8. The method of claim 7, wherein the privilege standard indicates that the level of authority must be below a root user level of authority.

9. The method of claim 8, wherein the privilege standard indicates that the level of authority grants the services with a subset of the authorities granted by the root user level of authority.

10. The method of claim 1, further comprising:
    prior to obtaining the request:
        obtaining source code for the service;
        generating metadata using the source code;
        obtaining a private key of a public private keypair; and
        signing the metadata using the private key to obtain the signed metadata and signing an image based on the source code using the private key to obtain the signed image.

11. A non-transitory machine-readable medium having instructions stored therein, which when executed by a processor, cause operations for securing a deployment comprising a data processing system, the operations comprising:
    obtaining a request for deployment of a service to the data processing system;
    initiating a deployment preparation process based on the request;
    during the deployment preparation process:
        obtaining a signed image and signed metadata for the service;
        verifying integrity of the signed image and the signed metadata;
        in an instance of the verifying where the integrity is verified:
            checking a privilege of the service using the signed metadata with respect to a privilege standard for the service;
            in an instance of the checking where the privilege meets the privilege standard for the service:
                generating at least one secret for the service; and
                instantiating a new instance of the service using the signed image, the signed metadata, and the at least one secret to initiate providing of desired computer implemented services by the new instance of the service.

12. The non-transitory machine-readable medium of claim 11, wherein the operations further comprise:
during the deployment preparation process:
generating an audit log for deployment of the new instance of the service.

13. The non-transitory machine-readable medium of claim 12, wherein the audit log indicates actions performed for the deployment of the new instance of the service.

14. The non-transitory machine-readable medium of claim 13, wherein the actions comprise the generating of the at least one secret, the checking of the privilege, and the verifying of the integrity of the signed image and the signed metadata.

15. The non-transitory machine-readable medium of claim 11, wherein the signed metadata indicates the privilege of the service.

16. A system, comprising:
a processor; and
a memory coupled to the processor to store instructions, which when executed by the processor, cause the system to perform operations for securing a deployment comprising a data processing system, the operations comprising:
obtaining a request for deployment of a service to the data processing system;
initiating a deployment preparation process based on the request;
during the deployment preparation process:
obtaining a signed image and signed metadata for the service;
verifying integrity of the signed image and the signed metadata;
in an instance of the verifying where the integrity is able to be verified:
checking a privilege of the service using the signed metadata with respect to a privilege standard for the service;
in an instance of the checking where the privilege meets the privilege standard for the service:
generating at least one secret for the service; and
instantiating a new instance of the service using the signed image, the signed metadata, and the at least one secret to initiate providing of desired computer implemented services by the new instance of the service.

17. The system of claim 16, wherein the operations further comprise:
during the deployment preparation process:
generating an audit log for deployment of the new instance of the service.

18. The system of claim 17, wherein the audit log indicates actions performed for the deployment of the new instance of the service.

19. The system of claim 18, wherein the actions comprise the generating of the at least one secret, the checking of the privilege, and the verifying of the integrity of the signed image and the signed metadata.

20. The system of claim 16, wherein the signed metadata indicates the privilege of the service.

* * * * *